US012746763B2

(12) United States Patent
Takehana

(10) Patent No.: US 12,746,763 B2
(45) Date of Patent: Sep. 29, 2026

(54) PRINTING DEVICE WITH ELECTROSTATIC FLOCKING PART

(71) Applicant: MIMAKI ENGINEERING CO., LTD., Nagano (JP)

(72) Inventor: Soichiro Takehana, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 240 days.

(21) Appl. No.: 18/703,717

(22) PCT Filed: Oct. 31, 2022

(86) PCT No.: PCT/JP2022/040752
§ 371 (c)(1),
(2) Date: Jul. 21, 2024

(87) PCT Pub. No.: WO2023/080117
PCT Pub. Date: May 11, 2023

(65) Prior Publication Data
US 2025/0269665 A1 Aug. 28, 2025

(30) Foreign Application Priority Data
Nov. 5, 2021 (JP) ................................ 2021-181124

(51) Int. Cl.
*B41J 11/00* (2006.01)
*B41J 2/17* (2006.01)
*B41J 29/377* (2006.01)

(52) U.S. Cl.
CPC ....... *B41J 11/00214* (2021.01); *B41J 2/1714* (2013.01); *B41J 11/00218* (2021.01); *B41J 29/377* (2013.01)

(58) Field of Classification Search
CPC ................ B41J 11/00214; B41J 2/1714; B41J 11/00218; B41J 29/377; B41J 29/13; B41J 2/17509; B41J 2/17513; B41J 2/01
See application file for complete search history.

(56) References Cited

U.S. PATENT DOCUMENTS

2014/0152734 A1* 6/2014 Endo ................... B41J 2/04556 347/16
2014/0354743 A1* 12/2014 Tsuchiya ............. B41J 11/0021 347/102
2018/0056685 A1 3/2018 Tsuchiya

FOREIGN PATENT DOCUMENTS

JP 2004314304 11/2004
JP 2010142954 7/2010
(Continued)

OTHER PUBLICATIONS

"International Search Report (Form PCT/ISA/210) of PCT/JP2022/040752", mailed on Jan. 10, 2023, with English translation thereof, pp. 1-4.
(Continued)

*Primary Examiner* — Bradley W Thies
(74) *Attorney, Agent, or Firm* — JCIPRNET

(57) ABSTRACT

A printing device 100 equipped with: a head 30 that ejects an ink which cures by being irradiated with light, toward a mounting face 11*a* on which a medium M is mounted; a light irradiation device 50 that is arranged side by side with the head 30 and irradiates the mounting face 11*a* with the light which cures the ink from a light-emission area 51*b* disposed on an irradiation face 51*a* facing the mounting face 11*a*; and electrostatic flocking parts 45 and 55 arranged in at least a part of a facing portion facing the mounting face 11*a* between the light-emission area 51*b* and the head 30; the
(Continued)

printing device 100 inhibits generation of a stray light which irradiates the head, with electrostatic flocking parts 45 and 55.

6 Claims, 4 Drawing Sheets

(56) References Cited

FOREIGN PATENT DOCUMENTS

| | | | |
|---|---|---|---|
| JP | 2010234818 | | 10/2010 |
| JP | 2010234818 A | * | 10/2010 |
| JP | 2014117926 | | 6/2014 |
| JP | 2014136314 | | 7/2014 |
| JP | 2014184666 | | 10/2014 |
| JP | 2014231161 | | 12/2014 |

OTHER PUBLICATIONS

"Notice of Reasons for Refusal of Japan Counterpart Application", issued on Dec. 16, 2026, with English translation thereof, p. 1-p. 8.

"Notice of Reasons for Refusal of Japan Counterpart Application", issued on Jul. 8, 2025, with English translation thereof, p. 1-p. 8.

"Search Report of Europe Counterpart Application", issued on Jan. 27, 2025, p. 1-p. 10.

"Office Action of China Counterpart Application", issued on Jan. 14, 2026, with English translation thereof, pp. 1-14.

* cited by examiner

PRINTING DEVICE WITH ELECTROSTATIC FLOCKING PART

CROSS-REFERENCE TO RELATED APPLICATION

This application is a 371 application of the International PCT application serial no. PCT/JP2022/040752 filed on Oct. 31, 2022, which claims the priority benefit of Japan Patent Application No. 2021-181124 filed on Nov. 5, 2021. The entirety of each of the above-mentioned patent applications is hereby incorporated by reference herein and made a part of this specification.

TECHNICAL FIELD

The present invention relates to a printing device.

BACKGROUND ART

Printing devices of ink curing type have been known (see, for example, Patent Literature 1). The printing devices eject ultraviolet-curable ink, for example, from a head to a medium to be printed. The printing devices cure the ejected ink by irradiating the ink with ultraviolet light from a light irradiation device.

CITATION LIST

Patent Literature

Patent Literature 1: Japanese Unexamined Patent Publication No. 2004-314304

SUMMARY OF INVENTION

Technical Problems

In the printing device as described above, a part of the ultraviolet light radiated from the light irradiation device can become a stray light. For example, a part of the radiated ultraviolet light is reflected by a medium, and the ultraviolet light reflected by the medium is reflected by a surface facing the medium, of the light irradiation device. The ultraviolet light can reach the head as a result of repeating such reflections. When the head is irradiated with such a stray light, ink in the head is cured, and can cause an ink clogging.

The present invention has been made in view of the above, and an object thereof is to provide a printing device capable of suppressing generation of stray light.

Solutions to Problems

A printing device according to the present invention is equipped with: a head which ejects an ink which cures by being irradiated with light, toward a mounting face on which a medium is mounted; a light irradiation device that is arranged side by side with the head and irradiates the mounting face with a light which cures the ink from a light-emission area disposed on an irradiation face facing the mounting face; and an electrostatic flocking part arranged in at least a part of a facing portion facing the mounting face between the light-emission area and the head.

In the printing device, the electrostatic flocking part is provided over the entire area on the head side of the light-emission area of the irradiation face.

In the printing device, the irradiation face has a planar shape, and disposed inclined so as to have an end portion on the head side positioned lower than an end portion on the opposite side to the head.

The printing device is further equipped with a duct arranged between the head and the light irradiation device, that has a suction port for sucking mist generated from the head.

In the printing device, the light irradiation device has a light source that emits the light and a cooling fan that cools the light source, and the duct is connected to a negative pressure side of the cooling fan.

In the printing device, the electrostatic flocking part is arranged in a portion of the duct facing the mounting face.

Effect of the Invention

According to the present invention, it is possible to suppress generation of stray light.

DESCRIPTION OF EMBODIMENTS

Hereinafter, embodiments of a printing device according to the present invention will be described with reference to the drawings. It should be noted that each of the embodiments shows one aspect of the present invention as an example, and does not limit the present invention. Constituent elements in the following embodiments include those easily replaceable by a person skilled in the art or those substantially the same with each other.

Figure 1:
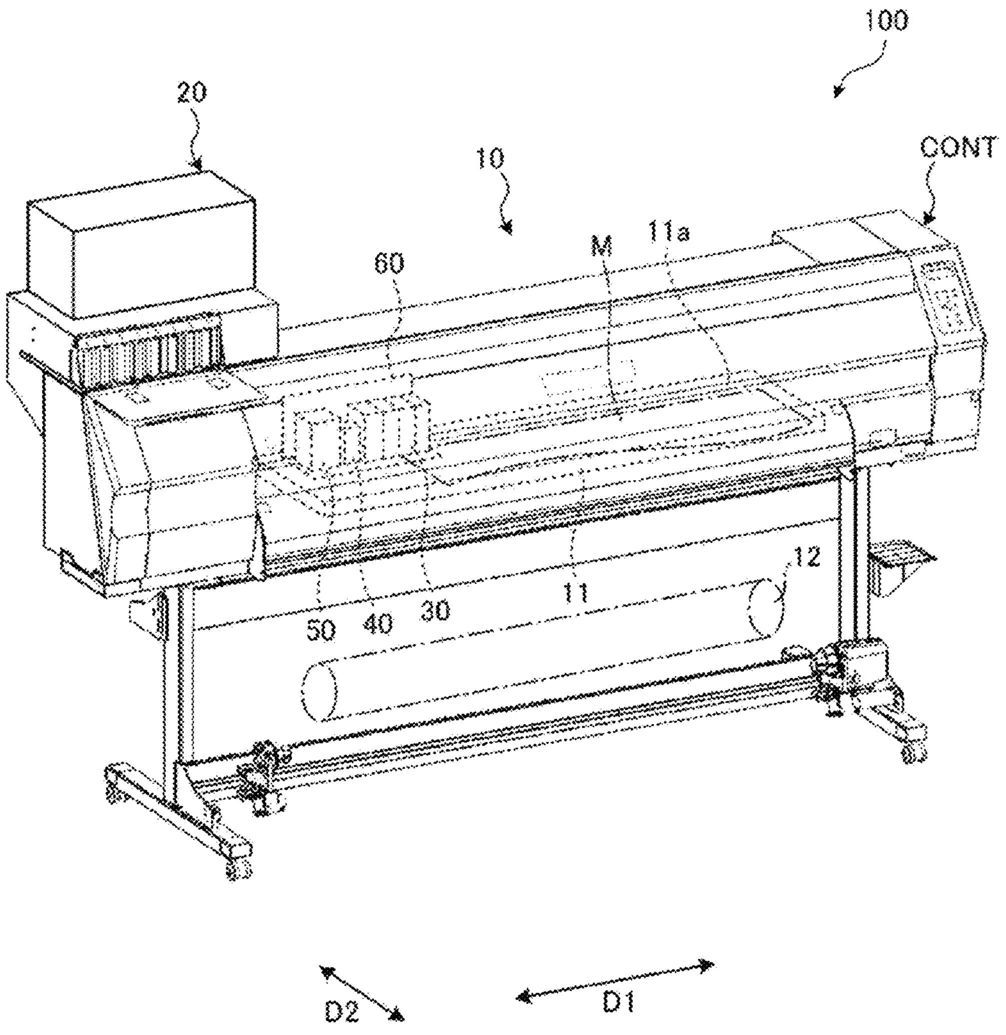
FIG. 1 is a perspective view illustrating an example of a printing device according to the present embodiment.

FIG. 1 is a perspective view illustrating an example of a printing device 100 according to the present embodiment. As shown in FIG. 1, the printing device 100 is an inkjet type printing device, and is equipped with a main body unit 10, an ink supply unit 20, a head 30, a duct 40, and a light irradiation device 50. Examples of such printing device 100 may include those of various types, for example, a vertical type or a flat bed type.

The main body unit 10 has a medium supporting unit 11 and a medium driving unit 12. The medium supporting unit 11 supports a medium M on a mounting face 11*a*. The medium driving unit 12 moves the medium M in a medium transporting direction D2. The medium transporting direction D2 is a direction orthogonal to a main scanning direction D1. The main scanning direction D1 and the medium transporting direction D2 are directions orthogonal to the vertical line direction.

The ink supply unit 20 has, for example, an ink container which is not illustrated. An ink contained in the ink container is supplied to the head 30 via a supply path which is not illustrated, and is ejected as droplets from the head 30.

Figure 2:
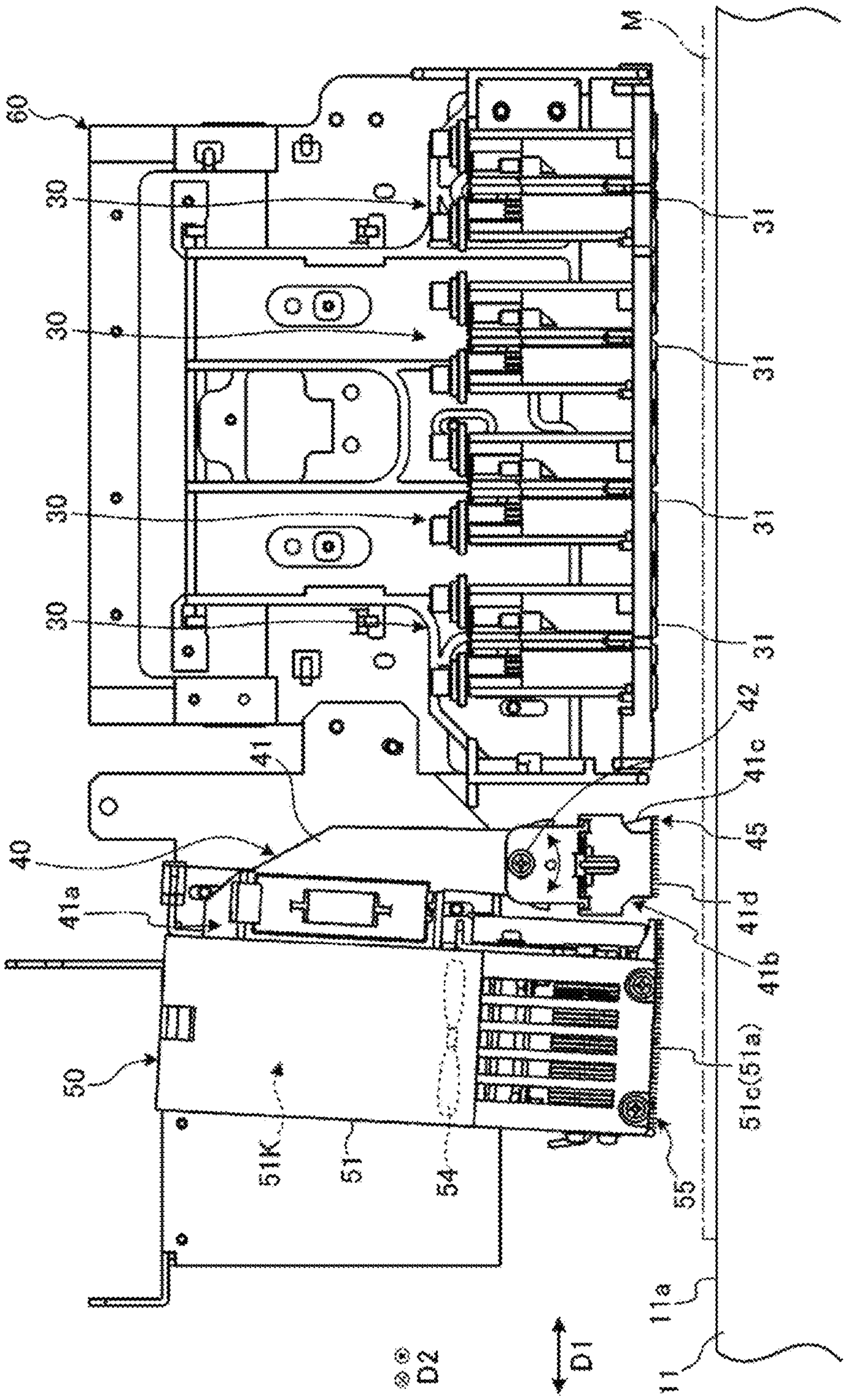
FIG. 2 is a view illustrating an arrangement example of the head, the duct, and the light irradiation device.
Figure 3:
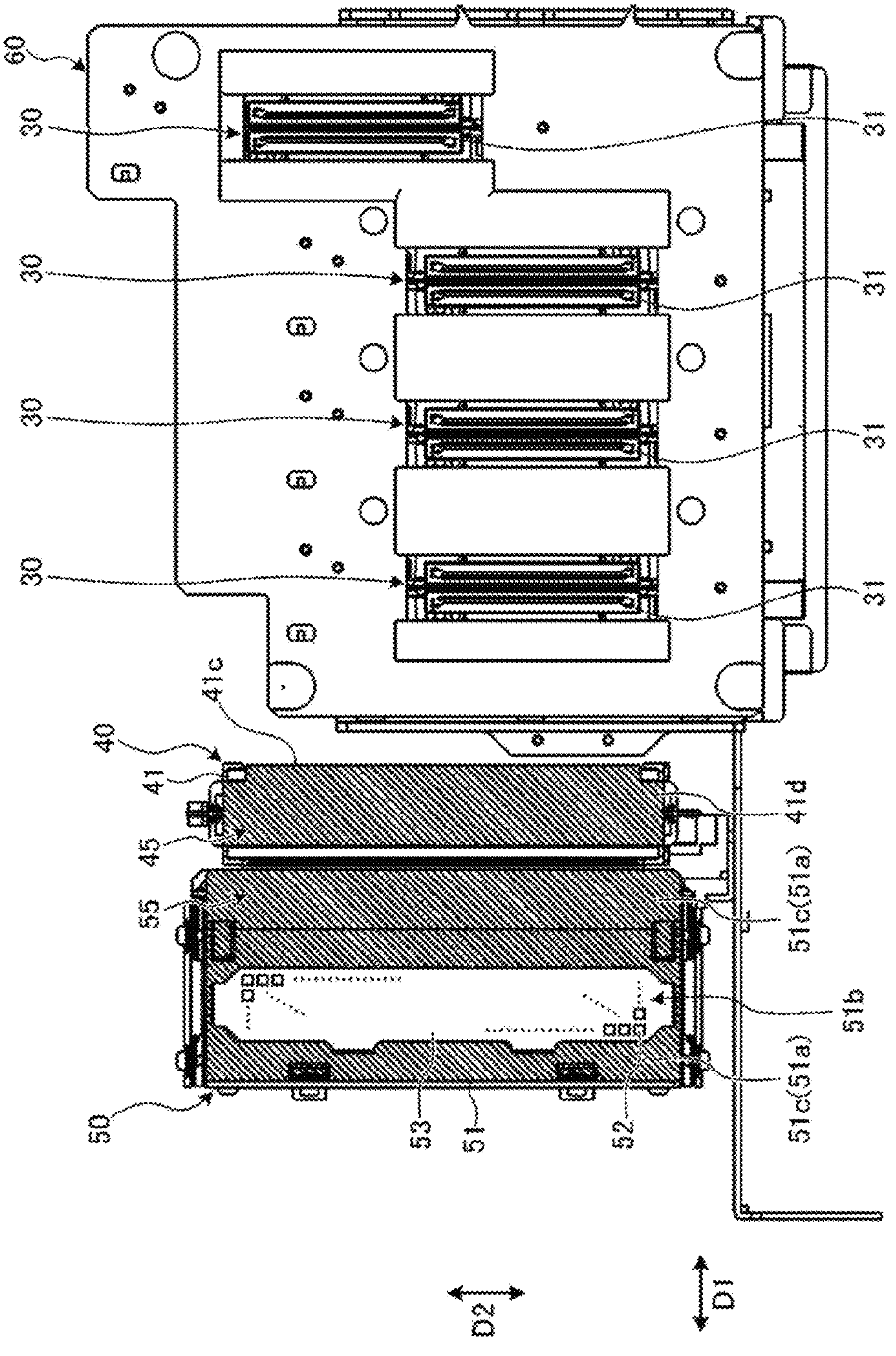
FIG. 3 is a view illustrating an arrangement example of the head, the duct, and the light irradiation device.

FIGS. 2 and 3 are views each illustrating an arrangement example of the head 30, the duct 40, and the light irradiation device 50. FIG. 2 is a view of a carriage 60 as viewed from the side, and FIG. 3 is a view of the carriage 60 as viewed from below. As illustrated in FIGS. 2 and 3, the head 30, the duct 40, and the light irradiation device 50 are mounted on the carriage 60 and arranged side by side in the main scanning direction D1. The head 30, the duct 40, and the light irradiation device 50 move integrally with the carriage 60 in the main scanning direction D1.

For example, a plurality of the heads 30 are arranged in the main scanning direction D1. Each of the heads 30 has a nozzle face 31 facing the mounting face 11*a*. The nozzle face 31 has, for example, a planar shape. The nozzle face 31 is provided with a plurality of nozzles for ejecting ink, which are not illustrated. Examples of the ink may include ultraviolet-curable ink. Examples of type of the ultraviolet-curable ink which can appropriately be used may include white ink, coloring ink of cyan (C), magenta (M), yellow (Y), and black (K), etc., and transparent ink, according to a color of an image to be formed on the medium M. The head 30 is electrically connected to a control unit CONT (see FIG. 1), and driving of the head 30 is controlled by the control unit CONT. The head 30 ejects the ink toward the medium M mounted on the mounting face 11*a*, while being reciprocated along the main scanning direction D1 by the movement of the carriage 60.

The light irradiation device 50 irradiates the ultraviolet-curable ink ejected on the medium M with an ultraviolet light. The light irradiation device 50 consists of, for example, an LED module capable of radiating ultraviolet light. The light irradiation device 50 is mounted on the carriage 60, and capable of reciprocating in the main scanning direction D1 along with movement of the carriage 60 along the main scanning direction D1. The light irradiation device 50 is electrically connected to the control unit CONT (see FIG. 1), and driving of the head 30 is controlled by the control unit CONT.

As illustrated in FIG. 2, the light irradiation device 50 has a housing 51. The housing 51 is provided with an irradiation face 51*a* facing the mounting face 11*a*. The irradiation face 51*a* has, for example, a planar shape. The irradiation face 51*a* is inclined so as to have an end portion on the head 30 side positioned lower than an end portion on the opposite side to the head 30, in the main scanning direction D1. That is, the irradiation face 51*a* is inclined so as to face opposite to the head 30.

As illustrated in FIG. 3, the irradiation face 51*a* is provided with a light-emission area 51*b*. The light-emission area 51*b* is an opening area provided to a part of the irradiation face 51*a*. For example, the light-emission area 51*b* is arranged in the center portion of the irradiation face 51*a* in the main scanning direction D1, so as to extend in the medium transporting direction D2. The light-emission area 51*b* irradiates the mounting face 11*a* with an ultraviolet light. A plurality of light sources 52 are disposed in the housing 51. The plurality of light sources 52 are arranged in a matrix-like state on a substrate 53 in the light-emission area 51*b*. The plurality of light sources 52 are provided overlapping the light-emission area 51*b* when viewed from the vertical direction. The plurality of light sources 52 are, for example, LED chips, and are arranged in a state where light emitting faces thereof are directed to the side of the light-emission area 51*b* (lower side in the vertical direction).

As illustrated in FIG. 2, inside of the housing 51 is provided with a cooling fan 54 that cools the plurality of light sources 52 and the substrate 53 (see FIG. 3). The cooling fan 54 is disposed above the substrate 53. The cooling fan 54 sprays the air toward the substrate 53 side. When the cooling fan 54 operates, an upper side of the cooling fan 54 inside the housing 51, namely, a space 51K on the opposite side to the substrate 53 has a negative pressure.

As illustrated in FIG. 3, an electrostatic flocking part 55 is arranged in an outer area 51*c* of the irradiation face 51*a* excluding the light-emission area 51*b*. The electrostatic flocking part 55 is provided over the entire area of the outer area 51*c*. The electrostatic flocking part 55 is formed using a material, for example, nylon. The electrostatic flocking part 55 is formed, for example, by applying an adhesive to the entire face of the outer area 51*c* and attaching a flocking material in a form of short fibers thereto, for example, with a direct-current (DC) voltage. The dimension in the longitudinal direction (vertical direction) of the flocking material constituting the electrostatic flocking part 55 may be, for example, 0.1 mm to 3.0 mm, and preferably 0.2 mm to 1.0 mm, approximately.

The duct 40 is arranged between the head 30 and the light irradiation device 50 in the main scanning direction D1. The duct 40 has a tube member 41. As illustrated in FIG. 2, the tube member 41 has a first end portion 41*a* on the upper side and a second end portion 41*b* on the lower side, in the vertical direction. The first end portion 41*a* is attached to an upper portion of the housing 51 and communicates with the space 51K inside the housing 51. That is, the first end portion 41*a* is connected to the space 51K inside the housing 51 where a negative pressure is formed by the cooling fan 54. The second end portion 41*b* of the tube member 41 has a bottom face 41*d* facing the mounting face 11*a* and a suction port 41*c* provided on the upper side of the bottom face 41*d* and opens toward the head 30 side. As an ink is ejected from the head 30, the ink in a mist-state (an ink mist) sometimes floats around the head 30. The duct 40 sucks the mist-state ink (the ink mist) from the suction port 41*c*.

As illustrated in FIG. 3, an electrostatic flocking part 45 is arranged on the bottom face 41*d* of the second end portion 41*b*. The electrostatic flocking part 45 is provided over the entire area of the bottom face 41*d*. The electrostatic flocking part 45 is formed by using a material, for example, nylon, similarly as the electrostatic flocking part 55. The electrostatic flocking part 45 is formed, for example, by applying an adhesive to the entire face of the bottom face 41*d* and attaching a flocking material in a form of short fibers thereto, for example, with a DC voltage. The dimension in the longitudinal direction of the flocking material constituting the electrostatic flocking part 45 may be, for example, 0.1 mm to 3.0 mm, and preferably 0.2 mm to 1.0 mm, approximately.

The duct 40 has an inclination adjustment unit 42. For example, the inclination adjustment unit 42 may consist of a connecting member that connects the second end portion 41*b* to a portion above the second end portion 41*b* of the tube member 41. For example, the second end portion 41*b* is rotatable about the connecting member by applying a force of a certain degree or more (see the dash-dotted lines in FIG. 5). In the duct 40, the inclination adjustment unit 42 allows the second end portion 41*b* to have an inclination adjusted with respect to the vertical line direction. By adjusting inclination of the second end portion 41*b* of the duct 40, it is possible to change opening direction of the suction port 41*c*. By adjusting inclination of the second end portion 41*b*, inclination of the bottom face 41*d* with respect to the mounting face 11*a* is changed.

For example, the duct 40 is capable of adjusting inclination of the second end portion 41*b* such that the suction port 41*c* has an opening direction downward obliquely toward the head 30 side. In this case, it is possible to efficiently suck the ink mist from the head 30 side. Additionally, in this case, the bottom face 41*d* is inclined so as to have an end portion on the head 30 side in the main scanning direction D1 positioned lower than an end portion on the opposite side to the head 30. That is, the bottom face 41*d* is inclined so as to be directed opposite to the head 30.

Next, an example of operation of the printing device 100 configured as described above will be described. The printing device 100 is set in a state, in advance, that the medium M is mounted on the mounting face 11*a* of the medium supporting unit 11.

In this state, for example, when there is an instruction to perform a printing operation from an external device, the control unit CONT moves the carriage 60 in the main scanning direction D1. The control unit CONT causes the head 30 to eject ink in conjunction with the movement of the carriage 60, and causes the light irradiation device 50 to emit an ultraviolet light. In addition, the control unit CONT operates the cooling fan 54 of the light irradiation device 50. By this operation, the ink adheres to the medium M, and the adhered ink is irradiated with the ultraviolet light. In addition, ink mist floating between the head 30 and the medium M or the mounting face 11*a* is sucked from the suction port 41*c* of the duct 40. The control unit CONT repeats the operation, while moving the medium M in the medium transporting direction D2. By this control, an image is formed on the medium M.

Figure 4:
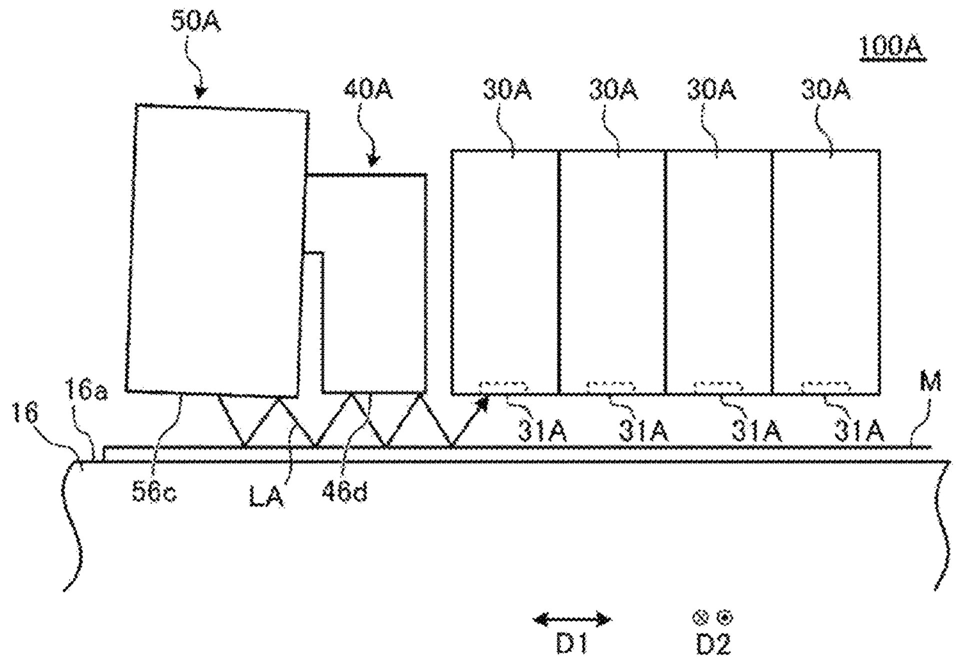
FIG. 4 is a view illustrating an example of operation of a printing device according to a comparative example.

FIG. 4 is a view illustrating an example of operation of a printing device according to a comparative example. FIG. 4 illustrates a state in which a medium M is mounted on a mounting face 16*a* of a medium supporting unit 16, in a printing device 100A according to the comparative example.

In this state, for example, a component LA traveling toward a head 30A side, that is a part of ultraviolet light radiated from a light irradiation device 50A, is reflected by the medium M. The reflected ultraviolet light LA sometimes reaches an outer area 56*c* of a light irradiation device 50A. The ultraviolet light LA which reached the outer area 56*c* is reflected by the outer area 56*c*, and this reflected ultraviolet light LA is reflected by the medium M again and travels toward the head 30A side, sometimes.

In this manner, the ultraviolet light LA which irradiated the medium M is reflected between the medium M and the outer area 56*c* repeatedly, to travel toward the head 30A side. The ultraviolet light LA further travels toward the head 30A side, similarly by being reflected repeatedly between the medium M and a bottom face 46*d* of a duct 40. Thus, there is a possibility that the ultraviolet light LA radiated from the light irradiation device 50A travels toward the head 30A side, and reaches a nozzle face 31A of the head 30A, as a stray light. An ink held in the nozzle face 31A can be cured by being irradiated with the stray light.

Figure 5:
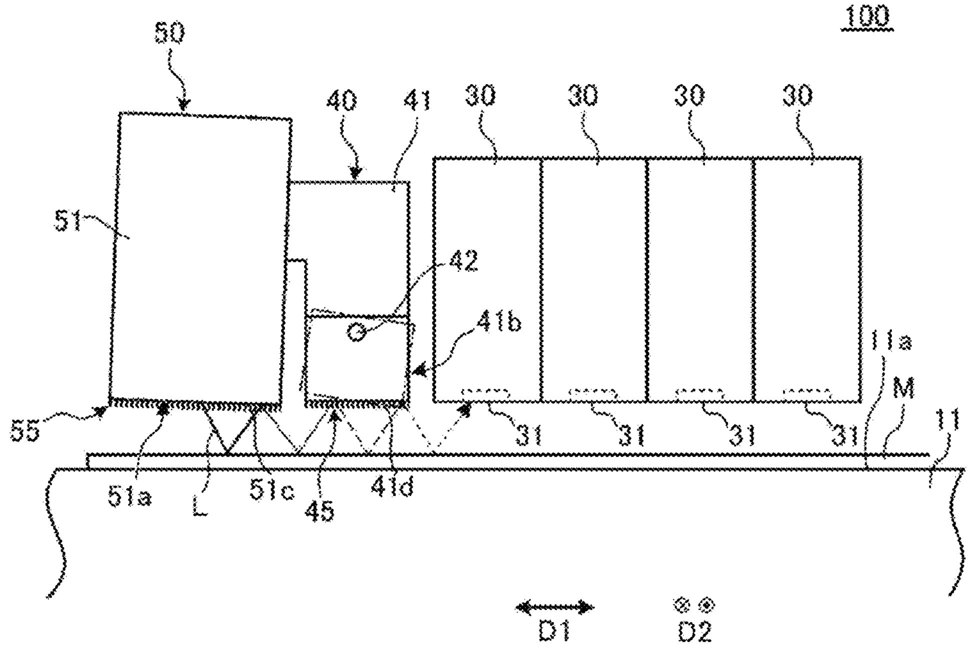
FIG. 5 is a view illustrating an example of operation of a printing device according to the present embodiment.

FIG. 5 is a view illustrating an example of operation of a printing device according to the present embodiment. FIG. 5 shows a state in which the medium M is mounted on the mounting face 11*a* of the medium supporting unit 11, in the printing device 100 according to the present embodiment.

In the present embodiment, the electrostatic flocking part 55 is provided in the outer area 51*c* of the housing 51 of the light irradiation device 50. Thus, when a component L of ultraviolet light radiated from the light irradiation device 50, which is reflected by the medium M has reached the outer area 51*c*, the electrostatic flocking part 55 absorbs at least a part of the ultraviolet light L. Therefore, it is possible to inhibit the ultraviolet light L which has reached the outer area 51*c* from being reflected by the outer area 51*c*. Thus, the electrostatic flocking part 55 is capable of attenuating the ultraviolet light L while the ultraviolet light L repeats reflection between the outer area 51*c* and the medium M. This allows inhibiting the stray light of the ultraviolet light L from traveling toward the head 30 side, to reach the nozzle face 31.

In addition, the irradiation face 51*a* of the light irradiation device 50 is inclined so as to be directed opposite to the head 30. This configuration allows inhibiting the ultraviolet light L from being reflected toward the head 30 side by the outer area 51*c* of the irradiation face 51*a*.

In the present embodiment, the bottom face 41*d* of the duct 40 positioned between the light irradiation device 50 and the head 30 in the main scanning direction D1 is also provided with the electrostatic flocking part 45. By this configuration, the electrostatic flocking part 45 absorbs at least a part of the ultraviolet light L that has reached the bottom face 41*d* of the duct 40. This allows inhibiting the bottom face 41*d* of the duct 40 from reflecting the ultraviolet light L that has reached the bottom face 41*d*. Accordingly, the electrostatic flocking part 45 is capable of attenuating the ultraviolet light L while the ultraviolet light L repeats reflection between the bottom face 41*d* and the medium M. This allows inhibiting the stray light of the ultraviolet light L from reaching the head 30. Besides, it is also possible to direct the bottom face 41*d* opposite to the head 30, by adjusting inclination of the second end portion 41*b* side of the tube member 41. This allows inhibiting the ultraviolet light L from being reflected toward the head 30 side by the bottom face 41*d*.

As described above, a printing device 100 according to the present embodiment is equipped with, for example, the following configuration.

(1) The printing device 100 is equipped with a head 30, a light irradiation device 50, and electrostatic flocking parts 45 and 55. The head 30 ejects an ink which cures by being irradiated with ultraviolet light (light) toward a mounting face 11*a* on which a medium M is mounted. The light irradiation device 50 is arranged side by side with the head 30, and irradiates the mounting face 11*a* with an ultraviolet light (a light) which cures ink from a light-emission area 51*b* disposed on an irradiation face 51*a* facing the mounting face 11*a*. The electrostatic flocking parts 45 and 55 are arranged in at least a part of a facing portion facing the mounting face 11*a* (the irradiation face 51*a* and a bottom face 41*d*) between the light-emission area 51*b* and the head 30 in a main scanning direction D1.

According to this configuration, when an ultraviolet light L reflected by the medium M has reached the facing portion facing the mounting face 11*a* (the irradiation face 51*a* or the bottom face 41*d*), a part of the ultraviolet light is absorbed in the electrostatic flocking part 45 or 55. This allows inhibiting the facing portion from reflecting the ultraviolet light L that has reached the facing portion. Accordingly, while the ultraviolet light L that has reached the facing portion repeats reflection between the facing portion and the medium M, it is possible to attenuate the ultraviolet light L, and thus it is possible to inhibit the ultraviolet light L from reaching the head 30 as a stray light.

(2) In the printing device 100 according to the present embodiment, the electrostatic flocking part 55 may be provided over the entire area of the head 30 side of the light-emission area 51*b* of the irradiation face 51*a*. As an example, the electrostatic flocking part 55 may be provided on the entire area of the outer area 51*c* excluding the light-emission area 51*b* of the irradiation face 51*a*.

According to this configuration, the electrostatic flocking part 55 is capable of absorbing and attenuating the ultraviolet light L radiated from the light-emission area 51*b* of the irradiation face 51*a*, which is then reflected by the medium M, and has reached the portion on the head 30 side of the outer area 51*c*. In addition, since the electrostatic flocking part 55 is formed on the entire area on the head 30 side from the light-emission area 51*b* of the outer area 51*c*, it is not necessary to apply a mask or the like, which allows forming the electrostatic flocking part 55 in a small number of steps.

(3) In the printing device 100 according to the present embodiment, the irradiation face 51*a* has a planar shape. The irradiation face 51*a* is arranged inclined so as to have an end portion on the head 30 side in the main scanning direction D1 positioned lower than an end portion on the opposite side to the head 30. This configuration allows inhibiting the ultraviolet light L that has reached the irradiation face 51*a* from being reflected toward the head 30 side.

(4) The printing device 100 according to the present embodiment is equipped with a duct 40. The duct 40 is arranged between the head 30 and the light irradiation device 50 in the main scanning direction D1. The duct 40 has a suction port 41*c* for sucking the mist generated from the head 30. According to this configuration, the duct 40 is capable of sucking ink mist, and thus it is possible to inhibit the ink mist from adhering to the electrostatic flocking parts 45 and 55. This allows inhibiting the electrostatic flocking part 45 and 55 from having a lowered ultraviolet light absorptivity.

(5) In the printing device 100 according to the present embodiment, the light irradiation device 50 has a light source 52 that emits light and a cooling fan 54 that cools the light source 52. The duct 40 is connected to a negative pressure side of the cooling fan 54. According to this configuration, it is possible to suck the ink mist efficiently utilizing a negative pressure generated by the cooling fan 54.

(6) In the printing device 100 according to the present embodiment, the electrostatic flocking part 45 is arranged on the bottom face 41*d* of the duct 40, that is a portion facing the mounting face 11*a*. According to this configuration, the electrostatic flocking part 45 is capable of absorbing a part of the ultraviolet light L reaching the bottom face 41*d* of the duct 40.

The technical scope of the present invention is not limited to the above embodiments, and may appropriately be changed without departing from gist of the present invention. For example, in the above embodiment, the present invention was described by describing the configuration in which the electrostatic flocking part 55 is formed over the entire face of the outer area 51*c* of the irradiation face 51*a* in the light irradiation device 50, as an example. However, the present invention is not limited thereto. For example, it could be a configuration in which the electrostatic flocking part 55 is provided only to an area on the head 30 side with respect to the light-emission area 51*b* in the main scanning direction D1 of the outer area 51*c*.

In the above embodiment, the present invention was described by describing the configuration in which the duct 40 and the light irradiation device 50 are respectively provided with the electrostatic flocking parts 45 and 55, as an example. However, the present invention is not limited thereto. For example, it could be a configuration in which either the electrostatic flocking part 45 or the electrostatic flocking part 55 is not provided.

In the above embodiment, the facing portion facing the mounting face 11*a*, between the light-emission area 51*b* and the head 30 was described by describing the bottom face 41*d* of the duct 40 and the outer area 51*c* of the light irradiation device 50 as examples. However, the present invention is not limited thereto. It is also possible to dispose another configuration facing the mounting face 11*a*, between the light-emission area 51*b* and the head 30. In this case, it is possible to arrange the electrostatic flocking part in at least a part of the facing portion facing the mounting face 11*a* of the another configuration.

In the above embodiment, the present invention was described by describing the configuration in which the duct 40 is arranged between the head 30 and the light irradiation device 50, as an example. However, the present invention is not limited thereto. For example, the description of the above embodiment may be applied also to a configuration in which the duct 40 is not arranged between the head 30 and the light irradiation device 50.

In the above embodiment, the present invention was described by describing the configuration in which the light irradiation device 50 is disposed only on one side of the main scanning direction D1 with respect to the head 30, as an example. However, the present invention is not limited thereto. It could be a configuration in which the light irradiation device 50 is disposed only on the other side than the side in the above-described embodiment in the main scanning direction D1 with respect to the head 30, or could be a configuration in which the light irradiation device 50 is disposed on both sides in the main scanning direction D1 with respect to the head 30.

In the above embodiment, the present invention was described by describing the configuration in which the electrostatic flocking part is not disposed on the head 30, as an example. However, the present invention is not limited thereto. It could be a configuration in which the electrostatic flocking part is arranged between the end portion and the nozzle face 31 in the main scanning direction D1 of the head 30.

REFERENCE SIGNS LIST

D1 Main scanning direction
D2 Medium moving direction
M Medium
CONT Control unit
10 Main body unit
11 Medium supporting unit
11*a* Mounting face
12 Medium driving unit
20 Ink supply unit
30 Head
31 Nozzle face
40 Duct
41 Tube member
41*a* First end portion
41*b* Second end portion
41*c* Suction port
41*d* Bottom face
45, 55 Electrostatic flocking part
50 Light irradiation device
54 Housing
51*a* Irradiation face
51*b* Light-emission area
51 Outer area
52 Light source
53 Substrate

54 Cooling fan
60 Carriage
100 Printing device

The invention claimed is:

1. A printing device comprising:

a head that ejects an ink that cures by being irradiated with a light, toward a mounting face on which a medium is mounted;

a light irradiation device that is arranged side by side with the head and irradiates the mounting face with a light that cures an ink from a light-emission area disposed on an irradiation face facing the mounting face;

an electrostatic flocking part arranged in at least a part of a facing portion facing the mounting face between the light-emission area and the head; and a duct that is arranged between the head and the light irradiation device and comprises a suction port for sucking a mist generated from the head, wherein the electrostatic flocking part is arranged in a portion of the duct facing the mounting face.

2. The printing device as set forth in claim 1, wherein the electrostatic flocking part is provided over an entire area of the head side of the light-emission area of the irradiation face.

3. The printing device as set forth in claim 2, wherein the irradiation face has a planar shape, and disposed inclined so as to have an end portion on the head side positioned lower than an end portion on an opposite side to the head.

4. The printing device as set forth in claim 1, wherein the irradiation face has a planar shape, and disposed inclined so as to have an end portion on the head side positioned lower than an end portion on an opposite side to the head.

5. The printing device as set forth in claim 1, wherein the light irradiation device comprises a light source that emits a light and a cooling fan that cools the light source, and the duct is connected to a negative pressure side of the cooling fan.

6. The printing device as set forth in claim 5, wherein the electrostatic flocking part is arranged in a portion facing the mounting face, of the duct.

* * * * *